United States Patent
Kolewe et al.

(10) Patent No.: US 10,729,168 B2
(45) Date of Patent: Aug. 4, 2020

(54) MANUFACTURED FRUIT COMPOSITIONS AND METHODS OF MAKING

(71) Applicant: Incredible Foods, Inc., Boston, MA (US)

(72) Inventors: Martin E. Kolewe, Chestnut Hill, MA (US); Daniel William Stone, Winthrop, MA (US); Kristen Enright, Somerville, MA (US)

(73) Assignee: Incredible Foods, Inc., Boston, MA (US)

( * ) Notice: Subject to any disclaimer, the term of this patent is extended or adjusted under 35 U.S.C. 154(b) by 195 days.

(21) Appl. No.: 15/682,689

(22) Filed: Aug. 22, 2017

(65) Prior Publication Data

US 2018/0049462 A1    Feb. 22, 2018

Related U.S. Application Data

(60) Provisional application No. 62/377,902, filed on Aug. 22, 2016.

(51) Int. Cl.
| | |
|---|---|
| *A23P 10/30* | (2016.01) |
| *A23L 29/238* | (2016.01) |
| *A23L 29/256* | (2016.01) |
| *A23L 21/18* | (2016.01) |
| *A23L 29/25* | (2016.01) |
| *A23L 29/269* | (2016.01) |
| *A23L 33/10* | (2016.01) |

(52) U.S. Cl.
CPC ............... *A23P 10/30* (2016.08); *A23L 21/18* (2016.08); *A23L 29/238* (2016.08); *A23L 29/25* (2016.08); *A23L 29/256* (2016.08); *A23L 29/27* (2016.08); *A23L 33/10* (2016.08); *A23V 2002/00* (2013.01)

(58) Field of Classification Search
CPC ........ A23P 10/30; A23L 21/18; A23L 29/238; A23L 29/25; A23L 29/256; A23L 29/27; A23L 33/10
USPC .......................................................... 426/89
See application file for complete search history.

(56) References Cited

U.S. PATENT DOCUMENTS

| 3,041,289 A | * | 6/1962 | Katchen | ................ B41M 5/165 |
| | | | | 426/415 |
| 2011/0111020 A1 | * | 5/2011 | Yan | ..................... A61K 9/5057 |
| | | | | 424/456 |
| 2015/0230513 A1 | * | 8/2015 | Stone | ..................... A23P 10/30 |
| | | | | 426/103 |

FOREIGN PATENT DOCUMENTS

| WO | WO-2009108769 A2 * | 9/2009 | ............. A23G 3/364 |

* cited by examiner

*Primary Examiner* — Jyoti Chawla
(74) *Attorney, Agent, or Firm* — Hogan Lovells US LLP

(57) ABSTRACT

A food composition and method of making is provided, the food composition comprising a first structural food unit comprising an edible matrix encapsulating an edible substance that optionally comprises one or more thickening agents; a second structural food unit, between about 10 times and about $10^6$ times the size of the first structural food unit, comprising an edible hydrocolloid matrix encapsulating a first visco-elastic substance, the first visco-elastic substance comprising a soft food, xanthan gum, and galactomannan and a plurality of first structural food units, and wherein an outer surface of the first visco-elastic substance substantially adheres to an inner surface of the edible hydrocolloid matrix encapsulating the first visco-elastic substance.

9 Claims, No Drawings

MANUFACTURED FRUIT COMPOSITIONS AND METHODS OF MAKING

RELATED APPLICATIONS

This application claims the benefit of Provisional Application Serial No. 62/377,902, filed Aug. 22, 2016, which is hereby incorporated by reference in its entirety.

TECHNICAL FIELD

This disclosure relates to edible materials and manufactured fruit-like food compositions.

BACKGROUND

Recreating the unique texture of real, fresh fruit with shelf-stable and processable components has been a long-standing goal in food science and engineering. The multi-dimensional size, scale, and cellular components of the internal structure of fresh fruit, in combination with the extent of aqueous hydration, has not yet been successfully recreated. Manufacturing fruit-like compositions can result in enhanced nutritional benefits and increased shelf life.

SUMMARY

This disclosure relates to manufactured fruit-like products. The manufactured fruit-like products provide certain advantages to the consumer compared to fresh fruit products. The manufactured fruit-like products are easily managed food alternatives providing for the ability to enhance nutritive benefits, enable palatable delivery of pharmaceuticals and nutraceuticals, as well as provide for increased shelf life compared to natural fruits.

Provided herein is a food composition, and methods of making the same, in the form of an encapsulated food product, a first structural food unit comprising an edible matrix encapsulating an edible substance that optionally comprises one or more thickening agents; a second structural food unit, between about 10 times and about $10^6$ times the size of the first structural food unit, comprising an edible hydrocolloid matrix encapsulating a first visco-elastic substance, the first visco-elastic substance comprising a soft food, xanthan gum, and galactomannan and a plurality of first structural food units, and wherein an outer surface of the first visco-elastic substance substantially adheres to an inner surface of the edible hydrocolloid matrix encapsulating the first visco-elastic substance. The food composition can further comprise a third structural food unit, between about 10 times and about $10^6$ times the size of the second structural food unit, comprising an edible hydrocolloid matrix encapsulating a second visco-elastic substance, the second visco-elastic substance comprising a soft food, xanthan gum, and galactomannan and a plurality of second structural food units, and wherein an outer surface of the second visco-elastic substance substantially adheres to an inner surface of the edible hydrocolloid matrix encapsulating the second visco-elastic substance. The first visco-elastic substance and the second visco-elastic substance can be the same, or can be different.

The food composition can be about 1 cm to about 25 cm in diameter.

The thickening agent can be a polysaccharide. The thickening agent can be selected from xanthan gum and a galactomannan. The galactomannan can be at least one of the group consisting of locust bean gum, guar gum, combinations thereof, and/or derivatives thereof. The thickening agent can be at least one of an agar and an alginate.

The food composition can be at least one of a gel, an emulsion, a foam, a semi-solid, and combinations thereof. The pH of the food composition can be about or above a pKa of an un-polymerized edible matrix. The pH of the food composition can be about or above pH 3.3.

The matrix can be at least one polysaccharide selected from the group consisting of a hydrocolloid, shellac, and fibers. The matrix can be at least one of an alginate and a chitosan.

The food composition can be comprised of a reconstituted fruit or a fruit puree. The reconstituted fruit or puree can be selected from the group consisting of acai, aceola, apple, apricots, avocado, banana, blackberry, blueberries, cantaloupe, camu camu berry, cherimoya, cherries, clementine, coconut, cranberry, cucumber, currents, dates, durian, fig, goji berries, gooseberry, grapefruit, grapes, jackfruit, jujube, kiwi, kumquat, lemon, lime, longan, loquat, lucuma, lychee, mamey sapote, mango, mangosteen, melon, mulberry, nectarine, orange, papaya, passion fruit, peach, pear, persimmon, pineapple, plum, pomegranate, pomelo, prickly pear, prunes, raspberries, sapote, strawberries, tangerine, tomato, watermelon, and combinations thereof.

DETAILED DESCRIPTION

Manufactured Fruit Compositions

Fresh fruits are characterized in part as having a high water content (>70%), and an inner texture that is firm and crisp. This firmness and crispiness of the inner fruit texture is a result of the cellular structure of the inner fruit material. The inner and outer structure of natural fruits are comprised of plant cells, a structural building block of natural plant material, which in turn are comprised mostly of aqueous cytoplasm surrounded by a rigid cell wall made of biopolymers including cellulose and pectin. The sensation of fruit crispiness experienced during mastication is due to the bursting effect of thousands of these plant cells during the compression (chewing) cycle. It is a multi-structured phenomenon wherein a collection of varying sized structural elements (aqueous plant cells surrounded by a rigid cell wall) result in distinctive properties at the macroscale (the crispness and aqueous nature of a natural fruit), evident during the mechanical process of chewing. For example, an orange is comprised of many aqueous (juice containing) plant cells collected into wedge shaped substructures, which in turn are organized into a sphere and surrounded by a skin. Biting into the wedge results in the release of juice from thousands of small plant cells. However, known food formulation strategies have not been able to replicate characteristic structure, sub-structure, and phenomenological crisp or crunch of the fruit, the aqueous mouth-feel, and an adhering outer layer, one commonly experiences with natural fruit compositions. Herein is described a manufactured fruitlike composition and methods of making, wherein the manufactured fruitlike composition exhibits the characteristic outer layer and an internal structure exhibiting a crisp, firm and aqueous inner material like that of a fresh fruit.

In order to recreate the textural element of real fruit, food material must be processed in such a way to give it a similar multi-scale structure. Molecular polymers naturally found in plant tissue, such as pectin or cellulose-derivatives, are often used to thicken or gel food material, essentially making it more firm. But without organization of these polymers at an intermediate microscale length (orders of magnitude larger than its molecular configuration), the food material does not exhibit a crisp or crunch. Herein is described a manufactured fruit like composition and methods of making, comprising: (1) small food elements encapsulated in a membrane at small scale (about 50 microns ("µm") to about 5000 µm) to emulate aqueous plant cells surrounded by a rigid cell wall ("structural food elements"), and (2) a series of larger encapsulating structural food elements comprising populations of smaller structural food elements and, optionally, a support substance such as a soft food or other visco-elastic substance, and (3) a peelable outer layer. In preferred embodiments, the final fruit-like product will be comprised of multiple levels of encapsulation, wherein a series of smaller structural food elements are encapsulated by increasingly larger structural food elements.

Embodiments of encapsulated foods are known in the art. See for example, PCT International Publication No. WO 2011/103594 and PCT International Application No. PCT/US2013/023500, and PCT International Patent Application No. PCT/US2015/016598. Encapsulation methods are known in the art for the creation of small scale compositions such as false caviar or false fish eggs (see, for example, U.S. Pat. No. 4,702,921).

Encapsulating Membranes

As used herein, the terms "membrane(s)," "matrix" or "matrices," "fruit-like membranes," or "encapsulating/encapsulation membranes" may refer to similar or different materials or kinds of materials, depending on the type of object, how many barrier layers of any sort it may have, or the properties and contents of any such barrier layers. Encapsulating membranes can be n the microscale (about 50 µm to about 5000 µm diameter) to the macroscale (for example up to about 25 centimeters diameter or larger) Thus, for some embodiments, the terms can be used interchangeably. In certain embodiments, membranes and/or membranes are edible, providing nutritious benefits as well as reducing concerns about littering and waste.

Embodiments of encapsulated fruit like foods described herein can have, e.g., varying membrane thickness, one or more of a variety of chemical constituents, varying numbers of membranes, various consumable payloads, various shapes, and are constructed from various membrane properties to provide a variety of flavors and textures and membrane characteristics. Embodiments of the encapsulated fruit-like compositions can be made at large scale, using, for example, injection techniques, spray and spray drying techniques, fluidized-bed and other technologies. See, for example, PCT International Publication No. WO 2011/103594 and PCT International Application No. PCT/US2013/023500, PCT International Patent Application No. PCT/US2015/016598 which are incorporated herein by reference in their entirety.

Membranes of encapsulated fruit like foods may be made by using any one of many edible and/or biodegradable polymers. Alginate (alginic acid) as an example of a polymer that can be used in forming a membrane of transport systems. Alginate is an anionic, polymeric polysaccharide, widely present in the cell walls of brown algae. It is a copolymer—$(M)_m$-$(G)_n$—segments composed of mannuronate M (mannuronic acid) and guluronate G (guluronic acid) monomeric subunits. The values of m and n, the ratio m/n, and the space distribution between M and G (i.e. presence of consecutive G-subunits and M-subunits, or randomly organized subunits) all play key roles in the chemical and physical properties of the final membrane.

Alginates have been applied to pharmaceutical preparations, impression-making materials (e.g., in dentistry and in prosthetics manufacturing), and in the food industry. Sodium alginates also have found application in restaurants, e.g., to create spheres of liquid surrounded by a thin jelly membrane. Small scale spherification or encapsulation (for example, false fish eggs) is known in the art. Indeed, beyond their biocompatibility to human use, polymers such as alginate have the capacity to easily form a gel. To induce rapid gelation by electrostatic cross-linking, the naturally present $Na^+$ ions are removed and replaced by divalent cations (e.g., $Ca^{2+}$ or another multi-valent cation such as $Mg^{2+}$).

Our approach involves forming encapsulated fruit like compositions that use various particles, particulates and polymers for encapsulation, in combination or separately, and in sizes from microscale to macroscale, arranged to create desired properties of in which fruit-like food compositions emulate fresh fruit, can be easily handled, and consumed. As used herein, the terms particle(s) and particulate(s) are used interchangeably.

In some embodiments, both the micro-bubbles as well as the fully encapsulated fruit like product is encased in a polysaccharide membrane, for example, an alginate membrane. Methods for encapsulation are known and also are found in PCT International Publication No. WO 2011/103594, PCT International Publication No. WO 2013/113027, PCT International Patent Application No. PCT/US2015/016598, which are incorporated herein by reference in their entirety.

In some embodiments, ingestible particles embedded in a fruit-like membrane are shown to improve the physical, chemical and/or physico-chemical performance characteristics of the membrane suitable for particular payloads (i.e. edible or potable substances), including, but not limited to, diffusion characteristics, pore size of the membrane, elasticity, etc. In certain embodiments, the ingestible particles impart a flavor, for example chocolate or various fruit flavors. When particles are charged and possess the same charge state as other membrane polymers or particulates, one can vary membrane component concentrations (for example, decreasing the membrane polymer concentration and increasing the membrane particulate concentration) while maintaining or optimizing membrane performance. In certain embodiments of, for example, an alginate based membrane, when particles carry the opposite charge state as alginate polymers or particulates, one can minimize or eliminate the need for a calcium solution or another multi-valent ion by using particles to bind with alginates or another charged polymer. For non-alginate based systems, combinations of homogenous particles can be used to encapsulate the edible material, or can be used in combination with polymers at lower weight %-by-mass than the particles (for example, less than 80%, less than 70%, less than 60%, less than 50%, less than 40%, less than 30%, less than 20%, less than 10% polymer). In certain embodiments, a thinner membrane can be sufficient to encapsulate a larger quantity of ingestible material, which may have further advantages of taste and texture. Particles contemplated herein include large food particles, for example greater than 1 millimeter (linseeds, sesame seeds, poppy seeds, chia seeds, chopped or pulverized foods including fruits, fruit skins, vegetables, etc.), small grains, and pulverized seeds, nuts, etc. In some embodiments, compositions use particulates less than about 1 millimeter.

In certain embodiments, particulates used for the encapsulating membrane(s) can advantageously affect the membrane strength, diffusion permeability, elasticity, compressibility, diffusion kinetics, pore size and stability. Important variables when considering particulates as components for membranes include: 1) the particle charge or net charge of a heterogeneous or homogenous particulate mix, 2) the specific combinations of particulates for a heterogeneous mix, 3) the hydroscopic or hydrophilic nature of the particulates, 4) solubility of particulates in a liquid polymer, 5) aqueous solubility of the particles, 6) particle solubility in polar, non-polar or amphipathic solvents, 7) particle size, 8) heterogeneity of particle size, 9) heterogeneity of particle sizes in a heterogeneous or homogenous mix of particles, 10) shape of particulates in a heterogeneous or homogenous mix of particles, and 11) chemical and physical nature of the edible or potable substance to be encased in the membrane when interacting with the particulates.

In some embodiments, the particles are neutrally charged. In some embodiments, the particulates have various charge states, and can have an opposite charge as the membrane polymer or other membrane constituents. The overall charge state of the membrane polymer or other membrane constituents influences the choice of particulates, as particles oppositely charged to the charge state of the membrane polymer or particle matrix are likely incorporated into the membrane matrix and preferentially bonded. Oppositely charged particles could contribute to the formation of salt bridges within the membrane matrix and/or membrane polymeric subunit architecture.

In certain embodiments, polysaccharide polymers are used as the membrane polymer. Polysaccharide polymer based membranes are porous, with porosity determined by the chemical content and 2-and 3-dimensional geometry of the polymeric structure of the membrane, for example the structure of the polysaccharide chain. Therefore, particulates are used that can be appropriately accommodated by the pore structure of the membrane, whether as particles that can be intercalated between polymeric chains and/or embedded into the pores to act as a plug based on a particulate size and shape, electrostatically bind to create salt bridges, enhance Van der Waal's interactions that can contribute to overall membrane stability, etc. As described herein, various physical and chemical characteristics of the particulates are matched to the membrane structure and chemistry to achieve a desired effect, for example increased impermeability, elasticity, membrane strength-to-weight ratio, color, syneresis, etc. In particular embodiments, the membrane can have a strength sufficient to support a volume of water, for example 1 cubic centimeters (cc), 5 cc, 10 cc, 20 cc, 30 cc, 40 cc, 50 cc, 100 cc, 200 cc, 300 cc, 400 cc, 500 cc, 600 cc, 700 cc, 800 cc, 900 cc, 1000 cc, 1200 cc, 1400 cc, 1600 cc, 1800 cc, 2000 cc, 3000 cc, 4000 cc, 5000 cc, 6000 cc, 7000 cc, 8000 cc, 9000 cc, 10000 cc, or more, without rupturing, and when handled or transported. In particular embodiments the membrane is a continuous membrane, fully encapsulating an edible or potable substance such that the edible or potable substance is fully contained and does not leak out from within encapsulation due to mechanical stress, rupture, shearing, etc., of the membrane. In other particular embodiments, the cross-linked matrix has a thickness from about 10 microns to about 200 millimeters.

In some embodiments, the particulates used for the membrane are sized at about 0.01 microns, at about 0.1 microns, at about 0.1 to 1.0 microns, at about 0.1 to 10 microns, at about 0.1 to 100 microns, at about 0.01 to about 1 millimeter or to about 3 millimeters, or at about 0.1 to about 1 millimeter or to about 3 millimeters. The size of the particulates may be important for embedment characteristics into the porous structure of the membrane.

The porosity of membranes is also determined in part by the ratios of the subunits and or the particulates that assemble to form the membrane. For example, alginate based membranes are composed of mannuronic acid and guluronic acid subunits. In general, for alginates, increasing the number of guluronic acid subunits relative to the number of mannuronic acid subunits will contribute to a loss of mobility of the membrane polymers, resulting in a stiffer and more stable membrane. However, the stability is also offset by increased porosity of the membrane. Also contributing to porosity can be the overall concentration of polymer used when in solution. All else being equal, increasing the concentration (and therefore the density) of a polymer can decrease the porosity of the final membrane. However, other considerations such as consumer preference or gustatory experience when ingesting the membrane will likely limit the range of desirable polymer concentrations. Therefore, ratios of polymeric building blocks and/or particulates of a membrane may be considered for determining membrane porosity with respect to particulate embedment, solution diffusion, and membrane permeability, and how these characteristics are related to each other.

In certain embodiments, the molecular weight of the membrane polymer is between about 2000 daltons and about 2,000,000 daltons or larger. In other embodiments, the polysaccharide polymer present in solution is between about 0.1% by weight and about 5% by weight, between about 0.1% and 10%, by weight, or greater.

In certain embodiments, not all of the particulates are incorporated into the membrane. Instead, in some embodiments, a layer of particulates remain unincorporated, and form a layer next to a membrane or between two or more membrane layers. The additional particulate layer therefore contributes to, for example, permeability, elasticity, strength, durability, syneresis, hygroscopy, hydrophobicity, etc., changes across and within membrane layers. Thus, the chemical nature of the particulates, for example if a hydrophobic particulate is used, can contribute to impeding the flow of liquid diffusion across an inner layer to an outer layer surface boundary. In some embodiments, particulates can be layered so that the particulate layer has multiple effects, for example an inner impermeability layer, a middle flavor/texture/payload (e.g. a pharmaceutical or supplement) layer, and an outer strength improving layer.

Particles as described herein can be both within the fruit-like food and/or in the membrane. The particles in the membrane and in the soft food can be the same particles or different particles, can be uniform size or exhibit a range of sizes, and/or exhibit similar or different physical-chemical characteristics.

In some embodiments, the fruit-like food can be coated and/or embedded in a plurality of membranes. In certain embodiments, the membrane layers are distinct and melded. In other embodiments, the membrane layers are separate and distinct from other membrane layers. In certain embodiments, the same polymer, particulate, or combination of polymer(s) and/or particulate(s) is used for each of the multi-membrane coatings as described herein. In certain embodiments, different polymers, particulates, or combination of polymer(s) and/or particulate(s) are used for each membrane in a multi-membrane layer. In some embodiments, a multilayered outer membrane has the same polymer, particulate, or combination of polymer(s) and/or particulate(s) in each of the outer layers, but the membrane components are different than that used in, for example, the inner membrane or other inner membrane layers.

To accomplish the use of the same membrane components in a multi-membrane layered system while keeping the layers separate and distinct, in some embodiments, the inner membrane is first constructed, with or without additional particulates and/or polymers incorporated into the inner membrane. The membrane coated substance can then be layered with one or more additional polymer/particulate layers of homogenous or heterogeneous polymer/particulates, and then the particulate layer can be coated again with another membrane. The process may be repeated as many times as desired to construct a multilayered product.

Various membrane polymers are contemplated for use in the membrane forming layers. Considerations for choice of membrane polymers include inherent physico-chemical characteristics (charge states, functional groups, kinetic reaction rates of polymerization, ion complex formation and cross-linking, etc.), texture, polymerization characteristics, reactivity to chemical interactions and reactions such as pH, ionic strength, specific ions and ratios of ions during polymerization, presence of complexing agents (e.g., phosphates, citrate, ethylenediaminetetraacetic (EDTA) acid, acids, glucono-delta-lactone (GDL), etc.), shielding susceptibility of electrostatic character of polymer and polymeric strands, and cost effectiveness if used for commercial production. Polysaccharide polymers contemplated herein include, but are not limited to, shellac, various fibers and hydrocolloids such as alginate, an agar, a starch, a gelatin, carrageenan, xanthan gum, gellan gum, galactomannan, gum arabic, a pectin, a milk protein, a cellulosic, gum tragacanth and karaya, xyloglucan, curdlan, a cereal β-glucan, soluble soybean polysaccharide, a bacterial cellulose, a microcrystalline cellulose, chitosan, inulin, an emulsifying polymer, konjac mannan/konjac glucomannan, a seed gum, and pullulan. Combinations of these polysaccharides are also contemplated herein.

Other membrane compounds considered for use as structure forming compounds to modify or be used in combination with a polymer-based membrane (for example, a membrane consisting of a polysaccharide) include bagasse, tapioca, chitosan, polylactic acid, processed seaweed, chocolate, starch, gum arabic, cellulose based fibers, natural and synthetic amino acids and polymers thereof, proteins and sugars/sugar derivatives, etc. Combinations of these compounds and compositions are also contemplated herein.

A multi-layered and/or multi-component membrane can have several advantages: increased longevity or freshness of the fruit-like food; limited diffusion of aqueous components of membrane polymers or fruit-like foods; decreased water activity of the potable or edible payload; wider spectrum of taste sensation and experience by a consumer when powders of different flavors and mouth feel sensations are used, for example, between layers in a multilayered composition, taste improvement of a pharmaceutical or over the counter drug(s) if used as the particulate, etc. Incorporation of particulates into the outermost membrane can modify membrane performance, for example the prevention of the outer membrane from polymerizing and/or mechanically bonding with the inner or proximate membrane layer. Unincorporated particulates also likely form a physical barrier between membranes so that a chemical or mechanical bonding between membranes does not occur. Electrostatic repulsion/attraction, hydrophobicity and/or hydrophilicity of particulates and other solvent/solute interactions between particulates and membrane polymer components may also contribute to preventing an interaction between a polymerized layer and a non-polymerized membrane component.

In some embodiments of a multilayered membrane, the proximately located membrane layers are made using the same polymer and the same particulates. In some embodiments, the proximately located membrane layers are made using different polymers and the same particulates to form the multiple membrane layers. In some embodiments, the proximately located membrane layers are made using the same polymers and different particulates to form the multiple membrane layers. In some embodiments, the proximately located membranes layers are made using different polymers and different particulates to form the multiple membrane layers. In some embodiments, different membranes are chosen wherein there is no inherent chemical or mechanical bonding between the membrane layers, thereby requiring no addition of particulates to the outer surface of the innermost membrane.

In some embodiments, membrane components, for example polysaccharides or proteins, are chemically modified with methods and compositions well known in the art. Modifications are important for altering functional groups of the membrane components which, in turn, can alter polymerization characteristics, chemical characteristics, physico-chemical characteristics, bonding propensities, electrostatics, hydrophobicity or hydrophilicity changes, diffusion propensity and resistance to diffusion, elasticity, stability, etc., in the final polymerized membrane. Modifications include, but are not limited to, carbamoylation, graft polymerization, etherification, esterification, reduction, oxidation, amination (e.g., (poly) lysine, arginine) halogenation, polymerization and degradation, complex formation with metals and salts, etc. See, for example, *Chemical and Functional Properties of Food Saccharides* (ISBN 978-0-8493-1486-5).

In some embodiments, various ions are employed for use in the polymerized membrane and related chemical processes. In, for example, the alginate polysaccharide membrane, ions are used to form cross-linkages between and among individual polymer strands. Various ion/counter ion salt complexes are contemplated for use herein, including, but not limited to, divalent cations such as calcium, potassium, magnesium, manganese, iron, zinc; trivalent cations including, but not limited to, manganese and iron; and salts thereof including, but not limited to, calcium lactate and calcium chloride.

In some embodiments, it is contemplated herein that micelles are formed within membranes and between membrane layers and/or between the inner membrane and the inner fruit-like core. Micelles can alter the taste experience or mouth feel for the final encased product. Additionally, micelles engineered into the final membrane coated product may contain other ingestibles including sweeteners, flavors (fruits, herbs and spices, etc.), herbal extracts, energy supplements, dietary supplements, pharmaceuticals, over the counter drugs, sleep aids, appetite suppressants, weight gain agents, antioxidants, nutraceuticals, confections, etc., and combinations thereof.

Soft Food Compositions

Soft foods can serve as a support infrastructure for the encapsulated microscale components that emulate aqueous plant cells surrounded by a rigid cell wall to create a fruit like core. Soft foods can be any solid food product that has been processed into a semi-solid to liquid state and treated with a thickening agent to achieve a desirable consistency, for example by reconstitution of an extract or processed food, or using a pureed food. Additionally, liquids, liquid food extracts, and/or naturally soft foods (e.g., ripe bananas) can be used in that natural state or further processed to achieve a desired firmness or viscosity. Soft foods can be, or can be processed from, for example, fruits, vegetables, meats, one or more dairy products, carbohydrate food products, botanicals, confections, fortified substances, and/or combinations of the above.

Fruits provide an excellent food source that can be used in its natural state, or further processed and refined with thickeners to achieve a more desirable viscosity. Fruits contemplated for the soft foods described herein include, but are not limited to, any of acai, aceola, apple, apricots, avocado, banana, blackberry, blueberries, cantaloupe, camu camu berry, cherimoya, cherries, clementine, coconut, cranberry, cucumber, currents, dates, durian, fig, goji berries, gooseberry, grapefruit, grapes, jackfruit, jujube, kiwi, kumquat, lemon, lime, longan, loquat, lucuma, lychee, mamey sapote, mango, mangosteen, melon, mulberry, nectarine, orange, papaya, passion fruit, peach, pear, persimmon, pineapple, plum, pomegranate, pomelo, prickly pear, prunes, raspberries, sapote, strawberries, tangerine, tomato, watermelon, and combinations thereof Thickeners Thickeners as used herein refers to substances used to produce viscous solutions or dispersions, to impart body, improve consistency, and/or stabilize emulsions, including suspending and bodying agents, setting agents, jellying agents, and bulking agents, etc., in the micro-scale components and/or soft foods. Thickeners can be synthetically manufactured or derived from natural sources. Natural thickeners (or thickening agents) commonly are derived or produced from starches, vegetable gums, pectin, peptide polymers, and proteins. Various thickeners contemplated for use herein include, but are not limited to, acids, acidifiers, antibleaching agents, antibrowning agents, anticaking agents, antimicrobial agents, antioxidants, antioxidant synergists, antisticking agents, binders, bleaching agents, bodying agents, buffers, bulking agents, carbonating agents, carrier solvents, clarifying agents, cloud producing agents, colloidal stabilizers, color fixatives, color stabilizers, coloring agents, defoaming agents, disintegrating agents, dispersing agents, dough conditioners, drying agents, emulsifiers, enzyme activators, extraction solvents, fillers, film formers, filter aids, firming agents, flavor enhancers, flavoring adjuncts, flavoring agents, flour-treatment agents, foaming agents, free-flow agents, freezants, glazes, gelling agents, general purpose additives, humectants, intensifiers, leavening agents, lubricants, maturing agents, moisture-retaining agents, neutralizing agents, oxidizing agents, packing gases, pH control agents, plasticizers, polishes, preservatives, propellants, sequestrants, solubilizers, stabilizers, starch-modifying agents, surface-active agents, surface-finishing agents, suspending agents, sweetening agents, synergists, texture-modifying agents, texturizers, thickeners, wetting agents, whipping agents, and derivatives and combinations thereof.

In certain embodiments, thickeners contemplated for use herein for fruit-like food compositions include, but are not limited to, 1,3-butylene glycol, acacia, acetic and fatty acid esters of glycerol, acetone, acetone peroxides, acetylated distarch adipate, acetylated distarch phosphate, acetylated monoglycerides, acid-treated starch, adipic acid, agar, alginic acid, alkaline-treated starch, aluminum ammonium sulfate, aluminum potassium sulfate, aluminum silicate, aluminum sodium sulfate, aluminum sulfate, aluminum ammonium sulfate, ammonium adipate, ammonium alginate, ammonium bicarbonate, ammonium carbonate, ammonium chloride, ammonium dihydrogen phosphate, ammonium hydrogen carbonate, ammonium phosphate, ammonium phosphatides, ammonium salts of phosphatidic acid, ammonium sulfate, anoxomer, ascorbic acid, ascorbyl palmitate, ascorbyl stearate, azodicarbonamide, beeswax, benzoic acid, benzoyl peroxide, beta-cyclodextrin, bleached starch, bone phosphate, brominated vegetable oil, butyl p-hydroxybenzoate, butylated hydroxyanisole, butylated hydroxymethylphenol, butylated hydroxytoluene, calcium acetate, calcium alginate, calcium aluminum silicate, calcium ascorbate, calcium benzoate, calcium bromate, calcium carbonates, calcium chloride, calcium citrate, calcium dihydrogen phosphate, calcium disodium ethylenediaminetetraacetate, calcium DL-malate, calcium ferrocyanide, calcium gluconate, calcium hydrogen sulfite, calcium hydroxide, calcium iodate, calcium lactate, calcium lactobionate, calcium peroxide, calcium phosphate, calcium polyphosphates, calcium propionate, calcium pyrophosphatecalcium salts of fatty acids, calcium silicate, calcium sorbate, calcium stearate, calcium stearoyl lactylate, calcium sulfate, calcium tartrate, calciumiodiate, candelilla wax, carbamide, carbon dioxide, carnauba wax, carob bean gum, carrageenan, castor oil, cellulose gum, celluloses, chlorine, chlorine dioxide, cholic acid, choline salts and esters, citric acid, citric and fatty acid esters of glycerol, crosslinked sodium carboxymethylcellulose, cupric sulfate, D-alpha-tocopherol, dammar gum, decanoic acid, dedesoxycholic acid, dedextrins, dextrin ethyl cellulose, dehydroacetic acid, dextrose, diacetyltartaric acid esters of mono- and diglycerides of fatty acids, diammonium hydrogen phosphate, dicalcium pyrophosphate, diethyl pyrocarbonate, dilauryl thiodipropionate, dimethyl dicaronate, dimethylpolysiloxane, dioctyl sodium sulfosuccinate, dipotassium hydrogen phosphate, disodium ethylenediamine-tetraacetate, disodium hydrogen phosphate, disodium pyrophosphate, distarch phosphate, DL-alpha-tocopherol, DL-tartaric acid, dodecyl gallate, erythorbic acid, ethoxyquin, ethyl alcohol, ethyl cellulose, ethyl hydroxyethyl cellulose, ethyl p-hydroxybenzoate, ethyl protocatechuate, ethylene dichloride, esters of glycerol and thermally oxidized soy bean fatty acids, ethoxylated mono- and diglycerides, ethyl hydroxyethyl cellulose, ferric ammonium citrate, ferrous ammonium citrate, formic acid, gellan gum, gelatin, genipin, gibberellic acid, glucono delta-lactone, glycerin, glycerol, glycerol ester of wood rosin, guaiac resin, guar gum, gum acacia, gum arabic, gum ghatti, gum guaiac, heptylparaben, peroxide derivatives, hydrogen peroxide, hydroxylated lecithin, hydroxypropyl cellulose, hydroxypropyl distarch phosphate, hydroxypropylmethyl cellulose, hydroxypropyl starch, insoluble polyvinylpyrrolidone, iron gluconate, iron lactate, isoamyl gallate, isopropyl alcohol, isopropyl citrate mixture, kaolin, karaya gum, L(+)-tartaric acid, lactated monodiglycerides, lactic and fatty acid esters of glycerol, lactitol, lactylated fatty acid esters of glycerol and propylene glycol, lactylic esters of fatty acids, lauric acid, lecithin, locust bean gum, magnesium carbonate, magnesium DL-lactate, magnesium gluconate, magnesium hydrogen carbonate, magnesium hydroxide, magnesium hydroxide carbonate, magnesium L-lactate, magnesium oxide, magnesium salts of fatty acids, magnesium silicate, magnesium stearate, maltitol, mannitol, methyl alcohol, methyl ethyl cellulose, methylcellulose, methylene chloride, metatartaric acid, methylparaben, microcrystalline cellulose, milk protein, mineral oil, modified cellulose, modified starches, monoglyceride citrate, mono- and diglycerides, monostarch phosphate, myristic acid, nisin, nitrogen, nitrous oxide, nordihydroguaiaretic acid, o-phenylphenol, octanoic acid, octyl gallate, oleic acid, oxidized starch, oxystearin, palmitic acid, paraffin wax, pectin, pentapotassium triphosphate, pentasodium triphosphate, petrolatum, petroleum jelly, petroleum wax, phosphated distarch phosphate, phosphoric acid, pimaricin, poloxamer 331, poloxamer 407, polydimethylsiloxane, polydextroses, polyethylene glycols, polyglycerol esters of fatty acids, polyoxyethylenes, polypropylene glycol, polysorbates, polyvinylpolypyrrolidone, polyvinylpyrrolidone, potassium acetate, potassium acid tartrate, potassium adipate, potassium alginate, potassium benzoate, potassium bicarbonate, potassium carbonate, potassium chloride, potassium citrate, potassium dihydrogen citrate, potassium dihydrogen phosphate, potassium ferrocyanide, potassium gibberellate, potassium gluconate, potassium hydroxide, potassium iodate, potassium lactate, potassium metabisulfite, potassium nitrate, potassium nitrite, potassium persulfate, potassium phosphate, potassium polymetaphosphate, potassium polyphosphates, potassium L(+)-tartrate, potassium salts of fatty acids, potassium sorbate, potassium sulfate, potassium sulfite, potassium tripolyphosphate, processed eucheuma seaweed, propane-1,2-diol alginate, propionic acid, propyl gallate, propyl p-hydoxybenzoate, propylene glycol, propylene glycol alginate, propylene glycol esters of fatty acids, propylene glycol mono- and diesters, propylene oxide, propylparaben, quillaia extracts, rice bran wax, salts of fatty acids, shellac, silicon dioxide, sodium acetate, sodium acid, sodium acid pyrophosphate, sodium adipate, sodium alginate, sodium aluminosilicate, sodium aluminum phosphate, sodium ascorbate, sodium benzoate, sodium bicarbonate, sodium bisulfate, sodium carbonate, sodium carboxymethylcellulose, sodium caseinate, sodium chloride, sodium citrate, sodium dehydroacetate, sodium diacetate, sodium dihydrogen citrate, sodium dihydrogen phosphate, sodium dioxide, sodium DL-malate, sodium erythorbate, sodium ferrocyanide, sodium fumarate, sodium gluconate, sodium hydrogen carbonate, sodium hydrogem DL-malate, sodium hydrogen sulfite, sodium hydroxide, sodium hypophosphite, sodium L(+)-tartrate, sodium lactate, sodium lauryl sulfate, sodium metabisulfite, sodium metaphosphate, sodium nitrate, sodium nitrite, sodium phosphates, sodium polyacrylate, sodium polyphosphates, sodium potassium tartrate, sodium propionate, sodium pyrophosphate, sodium salts of fatty acids, sodium sesquicarbonate, sodium stearoyl lactylate, sodium stearyl fumarate, sodium sulfite, sodium tartrate, sodium thiosulfate, sodium tripolyphosphate, sorbic acid, sorbitan monolaurate, sorbitan monooleate, sorbitan monopalmitate, sorbitan monostearate, sorbitan tristearate, sorbitol, sorbitol sodium, sulfur dioxide, stannous chloride, starches, starch acetate, starch sodium octenylsuccinate, stearic acid, stearyl citrate, stearyl monoglyceridyl citrate, stearyl tartrate, succinic acid, succinylated monoglycerides, sucroglycerides, sucroses, sucrose acetate isobutyrate, sucrose esters of fatty acids, talc, tannic acid, tannins, tara gum, tartaric acid, tert-butylhydroquinone, tetrapotassium pyrophosphate, tetrasodium pyrophosphate, thiodipropionic acid, tocopherols, tragacanth, tragacanth gum, triacetin, triammonium citrate, tricalcium phosphate, trichloroethylene, triethyl citrate, trimagnesium phosphate, tripolyphosphate, tripotassium citrate, tripotassium phosphate, trisodium citrate, trisodium phosphate, urea, waxes, xanthan gum, xylitol, and derivatives and combinations thereof.

Uses of Fruit Like Food Compositions

Fruit-like compositions as described herein can be used for various consumer markets. For example, children, babies and toddlers may have a difficult time biting and/or swallowing solid foods. The compositions and methods described herein allow for eating any of a variety of fruit like compositions in an easy and conveniently packaged portion. The encapsulated fruit like foods can be manufactured to specific sizes for portion control and to mitigate any potential hazards (e.g., choking). Adults with certain disabilities or conditions may also find the fruit like foods described herein to be convenient for providing alternative solutions to eating solid foods, fresh fruits for which allergens may be present or are otherwise difficult to digest, or for supplementing a fruitlike composition with pharmaceuticals, nutraceuticals, and the like. For example, hospital procedures may make it difficult for patients to chew and swallow hard or solid foods. Additionally, adults fitted with dentures may find the food products described herein to be a satisfying alternative to eating solid foods.

Example 1

Encapsulated Foods

Membrane layer and inner compositions to be used in the functional nutrition transport systems can include various ingredients to achieve different products (e.g., different flavors, textures and ingredients. Examples of membrane layer compositions and soft food compositions to be enclosed by the membrane are provided below. Thickeners are optionally used, and can increase the overall viscosity of the soft food to the desired hardness.

TABLE 1

Strawberry puree stock

| Ingredient | Amount * |
| --- | --- |
| Strawberry puree (Boiron) | 300 g |
| Calcium lactate | 6 g |

* base stock; individual serving size approximately 10 g of base stock

Mix together strawberry puree with calcium lactate. Freeze solution in desired mold or container.

TABLE 2

Strawberry caramel stock

| Ingredient | Amount* |
| --- | --- |
| Strawberry puree (Pacific Ridge Farms) | 201.7 g |
| Cane sugar (Domino) | 20 g |
| Water | 53.8 |
| Organic Tapioca flour (Let's Do Organic) | 20 g |
| Gellan gum (Kelcogel LT100) | 0.5 g |
| Strawberry Flavor #31684) | 4 g |

*base stock; individual serving size approximately 10 g of base stock

In an appropriate container, heat and mix tapioca flour, water and puree. After tapioca dissolves, add cane sugar. Once mixture is homogenous, add gelan gum and let mixure thicken. Remove from heat and transfer to mold. Let set to room temperature.

TABLE 3

Strawberry mousse stock

| Ingredient | Amount* |
| --- | --- |
| Strawberry puree (Boiron) | 130 g |
| Cane sugar (Domino) | 150 g |
| Water | 100 g |
| Gelatin, 225 bloom/40 mesh (FB Leiner) | 20 g |

*base stock; individual serving size approximately 10 g of base stock

Weigh out gelatin powder and hydrate in distilled water for 10 minutes. Mix puree and sugar in container and bring to boil. Once boil is achieved, remove container from heat and add gelatin slurry. Whisk together mixture for 10 minutes. Pour mixture into pan or mold and let rest at room temp for 2 hours.

Strawberry soft fruit stock

| Ingredient | Amount* |
| --- | --- |
| Strawberry puree (Boiron) | 300 g |
| Locust Bean Gum (TIC) | 75 g |
| Xanthan gum (Danisco) | 120 g |
| Strawberry flavor (Comax) | 0.6 g |

*base stock; individual serving size approximately 10 g of base stock

Weigh and mix together locust bean gum and xanthan gum. Add gums to puree and blend together with immersion blender. Heat solution to 90-100 C. Pour solution into desired mold or container, and cool to room temperature.

In general, the encapsulated soft food product can be made as follows. In an appropriate container, combine 15 g sodium alginate and into 985 g of mineral water, then heat over a low heat until it simmers. Mix until alginate is completely dissolved and solution has a uniform consistency. Let set at 4 C for 2-3 hours. Add sugar, stabilizer, flavorings, and other membrane components to a final concentration desired for the specific individual food compositions, and mix to a uniform consistency (see, for example, PCT International Publication No. WO 2013/113027, which is incorporated herein by reference in its entirety). Prepare a 2% calcium bath by mixing 20 g of calcium lactate with 1 liter water. Dissolve completely. Add soft food composition stocks to a pastry bag, piping bag, or similar device, or use pre-formed molds of food composition stocks. Dip end of pastry bag into inner membrane alginate solution, and form small spheres of 1-2 inch diameter. Alternatively, preformed portions of soft food compositions can be placed into the alginate solution, with or without a first calcium bath dip. Remove spheres from membrane alginate solution and place into calcium bath for 10-15 minutes. Remove spheres and dry the surface with absorbing paper. Store at 4 C or –20 C.

Example 2

Encapsulated Foods with Fruit-Like Outer Layer Adhering to an Inner Core

Critical to the design and manufacture of a "fruit like" product with a soft core is the inclusion of an outer layer (skin or membrane) that adheres or binds to the soft food inner core. Several advantages of this design include optional ingestion, a protective and washable layer, and minimizing water loss of the inner soft core. As provided herein, this natural fruit like product can be designed such that the inner soft food core adheres to the outer polymerized matrix or skin, allowing a consumer either to eat the entire encapsulated product or to peel away the encapsulating matrix from the inner soft food core and consume the inner core only. A reference set of inner core soft food components was designed with the following: 300 g pear puree, 50 g sugar, 1.6 g alginate, 1.2 g xanthan, 0.4 g agar, and 0.75 g locust bean gum (LBG), the mixture heated, homogenized and allowed to cool-set. After cool-set, the products were then encapsulated in an alginate/chitosan polymer matrix.

Adherence of the outer polymerized encapsulating matrix to the inner soft food core was evaluated. In one set of experiments, the inner soft food core pH was adjusted by dipping the reference cores in a bath of 2 M citric acid for 60 seconds. In a separate set of experiments the inner soft food core pH was adjusted by dipping the reference cores in a bath of 2 M citric acid for 60 seconds and then rinsing in de-ionized water for 10 seconds. In a third set of experiments, both xanthan gum and locust bean gum were removed and replaced with either agar or alginate until similar textural visco-elastic properties to the reference cores was achieved. In a fourth set of experiments, cores were manufactured that had either xanthan or locust bean gum removed, but no additional agar or alginate was included. For these cores not having either locust bean gum or xanthan gum, the cores remained in a viscous liquefied state not demonstrating any visco-elastic properties.

For all soft food cores, polymer matrix encapsulation was completed by coating the core in a bath of 1% alginate+1.5% cane sugar+0.5% carotenoid resin, followed by coating with a chitosan solution of 5.2% lactic acid +0.5% calcium lactate+5.0% chitosan to form an outer polymerized matrix encapsulating the inner soft food core. The alginate/chitosan polymerization step was repeated 3 times, and samples were allowed to cure for at least 48 hours.

Control groups with the reference cores showed characteristically tight encapsulating polymer matrix-to-inner soft food core adherence. Encapsulated food products could be cut into quarters with the polymer matrix remaining adhered to core. With effort, the polymer matrix could be separated or peeled from the inner soft food core, but still adhered tightly to all points of contact with the inner core.

The pH of the reference soft food inner core without citric acid treatment was approximately 4.0. After adjustment with citric acid solution, the outermost periphery of the soft food core (with and without washing in de-ionized water) was approximately pH 2.2. For both groups in which the pH of the inner soft core was adjusted to 2.2 and followed with encapsulation, the outer encapsulating matrix failed to show any adherence properties to the inner soft food core. The pKa of alginate is generally regarded to be 3.3-3.6, as the dissociation constants for the monomers comprising alginate (mannuronic acid and guluronic acid) are 3.38 and 3.65 respectively. Therefore, the pKa of the polymer is taken to be between those two values and is a function of monomer composition of the stock alginate. (Draget K I et al, Alginates from Algae in *Polysaccharides and Polyamides in the Food Industry. Properties, Production, and Patents.* Ed. A Steinbuchel and S K Rhee. Wiley VCH 2005 p1-30). Without reference to or limitation by any specific mechanism of adherence, pH of the reference standard inner soft food cores that adheres to the outer polymerized matrix was retained at a pH well above the approximate pKa of alginate solutions to promote inner soft food core-to-encapsulation matrix adherence.

Samples made by removing both locust bean gum and xanthan gum but having an increased agar concentration to match the mechanical properties of reference cores also showed extremely poor matrix-to-core adherence. The core was clearly loose inside of the encapsulating matrix before samples were cut: the spheres could be freely rotated inside of the encapsulating matrix, which came completely off after cutting the samples in half. No traces of inner soft food core were found on the contacted surface of the encapsulation matrix. pH testing indicated that these samples had the same pH as control samples (4.0).

Experimental groups that were pH adjusted approximately 2.2 or had the locust bean gum removed showed either a lack of adherence interactions interactions between the alginate/chitosan polymer encapsulating matrix and the inner soft food core. The lack of adherence was evident in the final products before they were cut in half, as the inner soft food cores felt loose inside of their encapsulating matrix. When the products were cut in half, the encapsulating matrix easily separated from the soft inner core. Control samples made with locust bean gum, xanthan gum and either or both alginate and agar exhibited a strong adherence interaction to the encapsulating matrix, as the matrix remained bound to the core after cutting the final encapsulated product, squeezing the final product to attempt extrusion of the soft inner core, and even after partial removal of the polymer matrix. These experiments indicate that the adhesion interaction is present when products are manufactured with the inner soft food core at a pH above the pKa of alginate and with the synergistic combination of locust bean gum, xanthan gum, and agar and/or alginate.

Example 3

Multi-Scale Fruit Textured Compositions with Fruit-Like Outer Skin Adhering to a Fruit Textured Inner Core Small food elements or micro-bubbles are created at the scale of 10-5000 μ, as desired, to create a structural food unit (analogous to a plant cell). These structural food units are comprised of an edible substance, for example a liquid, thickened liquid, a viscoelastic substance, etc., encapsulated in a membrane comprised of one or several layers alginate, chitosan, pectin, or other polymers. In certain embodiments, populations of these structural food units are optionally further encapsulated to create a larger sized structural food unit, each larger-sized structural food unit being at least about 10 times, at least about 100 times, at least about 1000 times, at least about 10,000 times, at least about 100,000 times, at least about 1,000,000 times larger than the smaller-sized structural food unit being encapsulated. As a non-limiting example, a smaller structural food unit can be about 50 μm, and a first larger structural food unit can be at least about 0.5 mm and encapsulates a population of the 50 μm structural food units. A second larger structural food unit can be made by encapsulating a population of 0.5 mm structural food units, and so on in a serial fashion until a final desired product size is achieved.

Each encapsulated structural food unit is optionally combined with a visco-elastic substance, for example a thickened soft food, optionally containing specific hydrocolloids such as locust bean gum and galactomannans. As described herein, the locust bean gum and a galactomannan allows the visco-elastic substance to adhere to an encapsulating membrane. The visco-elastic substance optionally can contain cold-set substances, other thickening agents, flavoring agents, etc. In certain embodiments, the visco-elastic substance of a smaller encapsulating or encapsulated structural food unit can be the same or different than a visco-elastic substance of a larger encapsulating structural food unit. Therefore, the serial encapsulation can be designed to form a final product of a desired texture by altering the size of the structural food units and the visco-elastic substance containing the structural food units.

In certain embodiments, serial encapsulation initiated with larger food elements leads to a softer, less viscous final product. In other embodiments, serial encapsulation initiated with smaller food elements can lead to a firmer, denser and crisper mouthfeel final product. The resulting texture of the fruit like product can be any desired crispness or softness, depending on the degree of encapsulation and the serial sizing of the structural food units. The fruit textured inner core is designed to have a final firmness based on the serial sizing of the structural food units, the composition of the visco-elastic substance containing the structural food units, and contain a high water content, all of which are desired to replicate the textural sensation of fresh fruit.

As a non-limiting example, a multi-scale cellular structure is created via a double encapsulation process. All quantities and concentrations are approximate. Starting structural food elements are manufactured by dispensing small volumes (10 μL to 1000 μL) of core material (82 g water, 18 g cranberry juice concentrate, 13 g cane sugar, 3 g calcium lactate, 0.6 g xanthan gum) into a 1.5% alginate bath to create an encapsulating membrane. These starting structural food elements are transferred to bath (82 g water, 18 g cranberry juice concentrate, 13 g cane sugar, 3 g calcium lactate) for further polymerization and temporary storage. The starting structural food elements are then combined with a visco-elastic substance (82 g water, 18 g cranberry juice concentrate, 13 g cane sugar, 0.25 g locust bean gum, 0.4 g xanthan gum) at a ratio of 4 parts structural food elements to 1 part visco-elastic substance. Approximately 5 mL of this mixture is dispensed into a 1.5% alginate skin bath, and then transferred to a chitosan bath (300 g water, 20 g lactic acid (88%), 2 g calcium lactate, 15 g chitosan) to fully set the outer membrane.

What is claimed is:

1. A multi-layered food composition, comprising:
    a first structural food unit comprising an edible matrix encapsulating an edible substance that optionally comprises one or more thickening agents;
    a second structural food unit, between about 10 times and about $10^6$ times the size of the first structural food unit, comprising an edible hydrocolloid matrix encapsulating a first visco-elastic substance, the first visco-elastic substance comprising a soft food a plurality of first structural food units, and wherein an outer surface of the first visco-elastic substance substantially adheres to an inner surface of the edible hydrocolloid matrix encapsulating the first visco-elastic substance.

2. The food composition of claim 1, further comprising a third structural food unit, between about 10 times and about $10^6$ times the size of the second structural food unit, comprising an edible hydrocolloid matrix encapsulating a second visco-elastic substance, the second visco-elastic substance comprising a soft food, and a plurality of second structural food units, and wherein an outer surface of the second visco-elastic substance substantially adheres to an inner surface of the edible hydrocolloid matrix encapsulating the second visco-elastic substance.

3. The food composition of claim 1, wherein the first visco-elastic substance and the second visco-elastic substance are the same.

4. The food composition of claim 1, wherein the composition is about 1 cm to about 25 cm in diameter.

5. The food composition of claim 1, further comprising at least one of the group consisting of locust bean gum, guar gum, combinations thereof, and/or derivatives thereof.

6. The food composition of claim 1, further comprising at least one of an agar and an alginate.

7. The food composition of claim 1, wherein the soft food comprises at least one of a gel, an emulsion, a foam, a semi-solid, and combinations thereof.

8. The food composition of claim 1, wherein a pH of the soft food is about or above a pKa of the un-polymerized edible matrix.

9. The food composition of claim 1, wherein the matrix comprises at least one of an alginate and a chitosan.

\* \* \* \* \*